US009946797B2

(12) United States Patent
Cardonha et al.

(10) Patent No.: US 9,946,797 B2
(45) Date of Patent: Apr. 17, 2018

(54) PERSONALIZED AGGREGATOR FOR ORGANIZING AND PUBLISHING PUBLIC AND PRIVATE CONTENT

(71) Applicant: International Business Machines Corporation, Armonk, NY (US)

(72) Inventors: Carlos Henrique Cardonha, Sao Paulo (BR); Ricardo Guimarães Herrmann, Sao Paulo (BR); Mateus Molinaro Motta, Sao Paulo (BR); Nicole Barbosa Sultanum, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 14/624,931

(22) Filed: Feb. 18, 2015

(65) Prior Publication Data

US 2015/0234844 A1    Aug. 20, 2015

Related U.S. Application Data

(60) Provisional application No. 61/941,216, filed on Feb. 18, 2014.

(51) Int. Cl.
*G06F 17/30*    (2006.01)
*G06Q 50/00*    (2012.01)

(52) U.S. Cl.
CPC .... *G06F 17/30867* (2013.01); *G06F 17/3089* (2013.01); *G06Q 50/01* (2013.01)

(58) Field of Classification Search
USPC .......................... 707/752, 802, 738; 715/753
See application file for complete search history.

(56) References Cited

U.S. PATENT DOCUMENTS 7,827,208 B2 * 11/2010 Bosworth ........... G06F 17/3089
707/802
7,886,000 B1 * 2/2011 Polis ................... H04L 67/2833
455/466

(Continued)

OTHER PUBLICATIONS

Bernstein et al., "Eddi: Interactive Topic-based Browsing of Social Status Streams", Proceedings of teh 23rd annual ACM symposium on User Interface Software and Technology, ACM, 2010, UIST'10, Oct. 3-6, 2010, New York, New York.

*Primary Examiner* — Hung T Vy
(74) *Attorney, Agent, or Firm* — Scully, Scott, Murphy & Presser, P.C.; Louis Percello, Esq.

(57) ABSTRACT

A system, method and computer program product for allowing users to organize and selectively publish content of interest, with freedom to rearrange and curate information in a desired presentation format. The content may be generated by the user or other sources, allowing the user to moderate and organize the content that the user aggregates. The content (e.g. social network posts, online news, SMS messages) may be publicly available for other users to contribute with new information, or used as source for their own content of interest; it can also be shared only with select users or communities (registered or not), or be kept private. Publishing channels might comprise, for instance, web portals or public displays. Filters may be applied to automatically select and aggregate content from several sources. Methods are implemented to organize content by creating, discarding, replicating and reformatting information via a display interface.

16 Claims, 11 Drawing Sheets

(56) References Cited

U.S. PATENT DOCUMENTS

| | | |
|---|---|---|
| 8,429,277 B2 | 4/2013 | Dale et al. |
| 8,458,046 B2 | 6/2013 | Myslinski |
| 9,384,211 B1 | 7/2016 | Castillo et al. |
| 2007/0150498 A1 | 6/2007 | Li et al. |
| 2007/0244906 A1 | 10/2007 | Colton et al. |
| 2010/0103124 A1 | 4/2010 | Kruzeniski et al. |
| 2011/0004831 A1 | 1/2011 | Steinberg et al. |
| 2012/0278329 A1* | 11/2012 | Borggaard ........ G06F 17/30699 707/738 |
| 2013/0024788 A1* | 1/2013 | Olsen .................... G06Q 10/10 715/753 |
| 2013/0073945 A1 | 3/2013 | Bingell et al. |
| 2013/0151948 A1 | 6/2013 | Khalil et al. |
| 2013/0262242 A1 | 10/2013 | Tateo et al. |
| 2013/0290110 A1* | 10/2013 | LuVogt .................. G06Q 30/02 705/14.66 |
| 2013/0298038 A1* | 11/2013 | Spivack ................ H04L 65/403 715/753 |
| 2014/0164504 A1* | 6/2014 | Dellenbach ........... H04L 67/306 709/204 |
| 2014/0173461 A1* | 6/2014 | Shahade ............... H04L 65/403 715/753 |
| 2015/0088668 A1 | 3/2015 | Bruce et al. |

\* cited by examiner

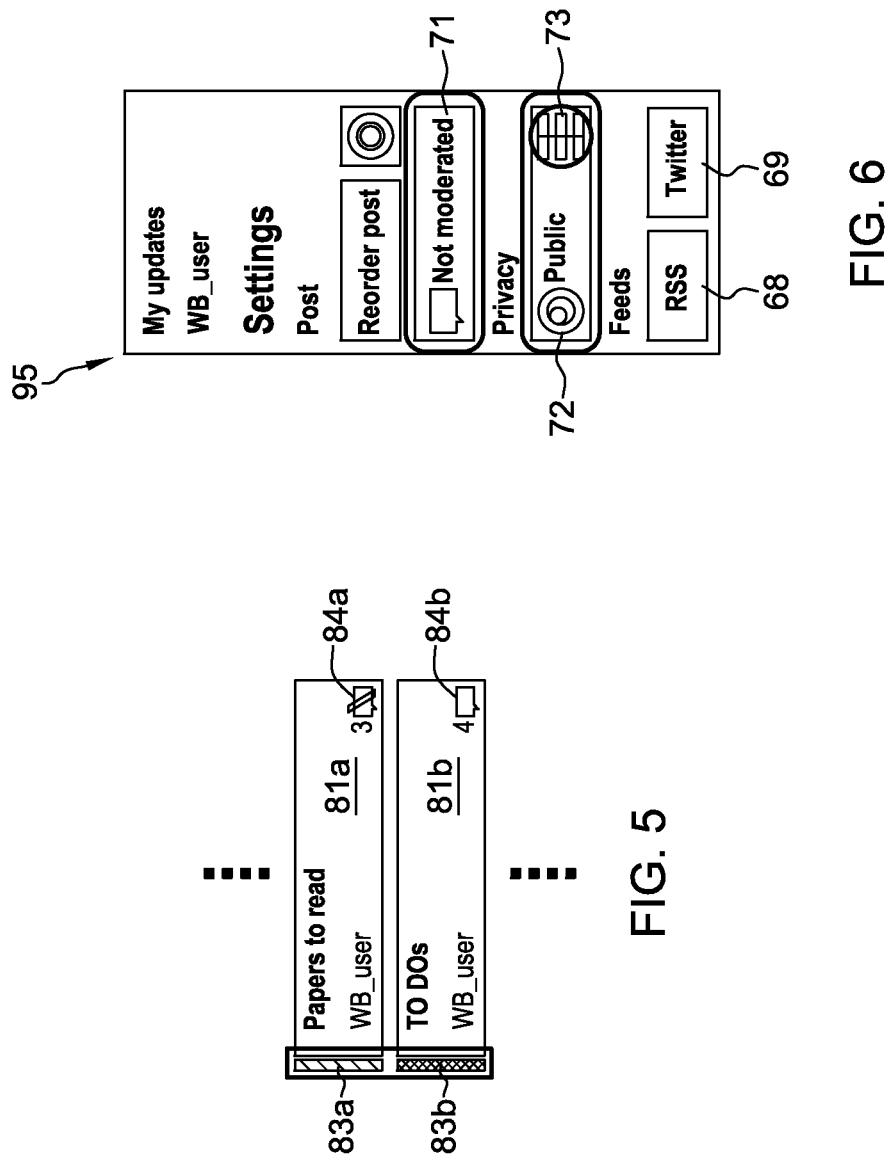

PERSONALIZED AGGREGATOR FOR ORGANIZING AND PUBLISHING PUBLIC AND PRIVATE CONTENT

CROSS REFERENCE TO RELATED APPLICATION

This application is a conversion application of U.S. Provisional Patent Application Ser. No. 61/941,216, filed Feb. 18, 2014 the entire content and disclosure of which is incorporated herein by reference as if fully set forth herein.

BACKGROUND

In the era of information, more and more content is generated each day. Daily news, blogs, topics of interest, conversations with friends, are examples of content people strive to keep up to date to—content generated from several sources, and sometimes requiring different tools to access them. There is also a growing trend of content sharing, to broadcast personal content or a personalized selection of public content to an audience through blogs or other social media tools. The input of this information is often done by a single individual, mostly done on a chronological fashion, and may touch on a variety of unrelated and unorganized topics.

Currently, there is no adequate way for a user to specify who has access to the content.

While some current publicly available systems and services may exhibit an assortment of desired features for socially aggregating content: e.g., Google Wave [discontinued] (dynamic threads), Google+ (circle-specific conversations), Stack Exchange (doesn't link to old answers, however), Yahoo! Answers (voted discussions), Quora (topics of interest), Reddit (ranked discussions), Wikipedia (sequence neutral content), Twitter (chronological UI, feeds and notification), Eddi [twitter client] (clustering of topics), Yahoo! Pipes (fetching and filtering criteria and programmability), among others, no one system captures a full range of functionality for aggregating, organizing, and curating content.

For example, in some limited-access environments, controlled content publishing is critical where distinct work roles and confidentiality restrictions apply. Simultaneously, a focus on technical assistance and conversations rather than status updates leads to a need for mechanisms that enable efficient search, grouping, and filtering of large amounts of content.

SUMMARY

There is provided a system and method for converging and organizing content for facilitated content management, for content curation, and controlled access to be flexibly defined by a user in a visual and unobtrusive way.

In one aspect, there is provided a tool for curating electronic content. The tool comprises: a memory storage device for storing content previously created by one or more users of a social network, the content including at least one container having a plurality of content elements. A processor device associated with the memory storage device is provided, wherein the processor device is configured to perform a method to: receive, via commands communicated over a network from a computer device, a user selection of a container having the plurality of content elements; respond to the commands communicated from the computer device to aggregate select elements from the container; respond to the commands communicated from the computer device to filter out select elements from the container; respond to the commands communicated from the computer device to rearrange an order of select elements in the container; create a new container having the aggregated elements in the rearranged order with select elements filtered out to prevent access by other users; and publish, for access by select user devices over the network, the new container.

In a further aspect, a method for curating electronic content comprises: storing, in a memory storage device, content previously created by one or more users of a social network, the content including at least one container having a plurality of content elements; receiving, at a processor device associated with the memory storage device, commands communicated over a network from a computer device of a user, to select a container having the plurality of content elements; aggregating, by the processor device, responsive to the commands communicated from the computer device, select elements from the container; filtering out, by the processor device, responsive to the commands communicated from the computer device, select elements from the container; rearranging, by the processor device, responsive to the commands communicated from the computer device, an order of select elements in the container; creating a new container having the aggregated elements in the rearranged order with select elements filtered out to prevent access by other users; and publishing, for access by select user devices over the network, the new container.

A computer program product is provided for performing operations. The computer program product includes a storage medium readable by a processing circuit and storing instructions run by the processing circuit for running a method(s). The method(s) are the same as listed above.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 5 shows a detailed view of two collections from the listings 80 of collections from the home screen 75, one being a public collection, and the other, a private collection;

FIG. 6 shows a detailed view of an embodiment of the collections setting menu 95 providing the curation filtering capabilities to configure a collection in one embodiment;

DETAILED DESCRIPTION

A system, method and computer program product for aggregating online content, where a moderator curates data from multiple internal or external sources and selects the way this collection of information can be published and accessed by other users, so that they can contribute further. Thus, a moderator (defined as one who is an owner of a collection) also produces content (e.g., posts can also be generated from within the system, either by the owner of a collection as well as other users/moderators). Specifically, in one embodiment, a moderator (defined as one who is an owner of content) or a user is permitted to aggregate content and subsequently organizes content created by a user and/or other users, such as posted and linked content, and/or sources into collections, and select sharing and moderating criteria for publishing these collections.

In one embodiment, the system provides means to enable aggregating the user-provided content in ways defined by a moderator. In one embodiment, users having a role of moderator can check the facts contained in posted and linked content and analyze the veracity of statements, i.e., essentially curating the data. As an example, a user who owns a collection would be a moderator of that collection.

In one embodiment, the system and methods implemented enable explicit content curation by users (e.g., a moderator) to be consumed by other users, and the publishing rules of this content as specified by the user. Methods may be invoked to provide for content publishing and sharing, including provision of whole social network and access control components. Any means for access control are defined by the content curator (hereinafter "moderator").

As will be referred to herein, the following definitions are provided:

Content element: a unit of content to be displayed. Can be user-generated, or fetched from other sources (e.g., social network posts, online news, SMS messages). Can be any kind of media content—images, video, sound, text, etc.

Filter: criteria for selecting content—usually related to a central topic or common goal.

Collection: a group of content elements that may be aggregated according to automatic or manual filters.

Board: a group of collections, to be displayed simultaneously.

Community: a group of users that can be given access to a board, and/or a collection.

Sharing Criteria: define access policies for reading content. They can be applied to collections and/or boards. Possible statuses are "public" (anyone can access), "selected" (user specifies a set of communities that can access the content), or "private" (only the creator can access the content).

Moderating Criteria: define access policies for contributing with content. They can be applied to collections and/or boards. Possible statuses are "public" (anyone can contribute), "selected" (only specific communities can contribute), or "private" (only the creator can contribute).

Gateway: an optional external entry point for a board.

Figure 1:
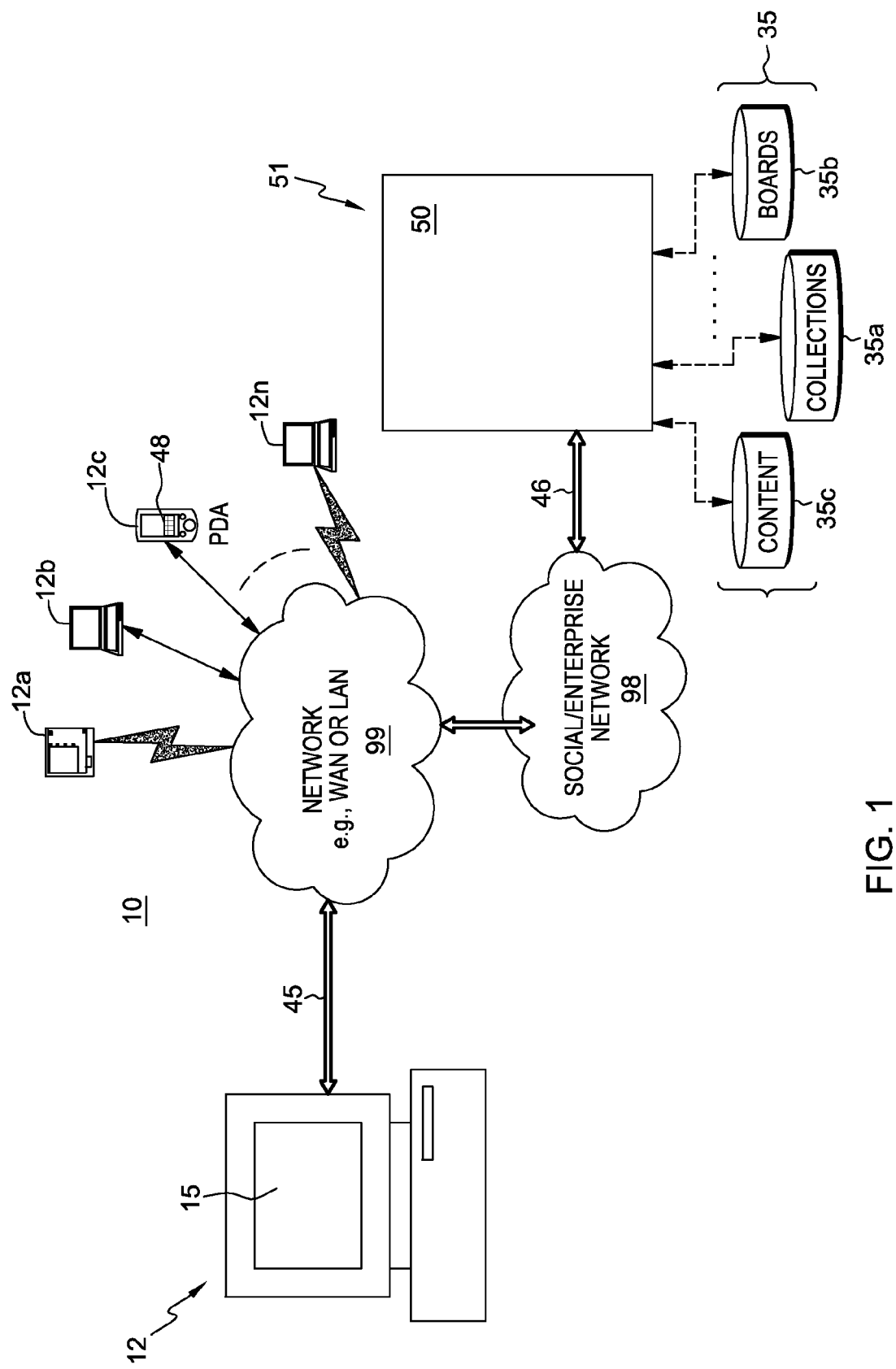
FIG. 1 shows an exemplary environment for aggregating and curating web based content for specifying a collection or a board.

FIG. 1 shows an exemplary environment 10 for aggregating and curating web based content for specifying a collection or a board in one embodiment. As shown, there is provided a user device 12, e.g., referred to herein as a content curator or moderator device 12, shown coupled to a social network 98, e.g., via a communications network 99, over which the device 12 communicates (sends and receives) signals 45. The social network 98 may be web-based and provides social networking and communication services as known in the art. In one embodiment, the network 98 may be a private enterprise social network, e.g., a social network administered by a corporation or enterprise, e.g., Yammer®, Jive®, IBM Connections. The stored content may include, but is not limited to: chat or communicated messages, links, electronically stored textual media or other types of media content, stored or published by and associated with members of the social network 98, or other web-based content not necessarily associated with social network members.

As further shown in FIG. 1, in one embodiment, associated with the enterprise network or social network 98, and in electronic communication therewith, is a processing engine 50 that may be provided as a web-based tool 51 to provide features for managing the aggregating and curating social or enterprise network content by a moderator. Specifically, content that may be aggregated and curated may be stored in one or more data storage devices 35. A data storage device 35 may include a database such as a relational database having the content to be aggregated and/or curated and made accessible by the processing engine 50. In one example embodiment, the data storage device 35 may include two or more databases, a first database 35a including stored collections previously created by users of the network, a second database 35b including stored boards of collections previously created by users of the network, and a third database 35c containing the posted content for all registered users and non-registered users. Content of these databases may be consolidated in a single or multiple storage devices 35.

In one embodiment, as shown in FIG. 1, in accordance with functionality described herein, the moderator may grant to one or multiple other users of the social network site or enterprise network 98 selected content access rights, to enable access to and/or view specific aggregated and curated content stored in data storage devices 35 remotely, e.g., via their wired or wireless communication connections from user devices 12a, . . . , 12n, which may comprise, for example, a Smartphone, laptop, mobile or desktop computer, over the network 99. It is understood that processing engine may encompass a web-server, configured as a web-based tool 51 and accessible via the moderator device 12 or other users via devices 12a, . . . , 12n, e.g., via the public Internet in accordance with standard TCP/IP protocols and/or optionally, over a secure communications link, e.g., implementing secure sockets layer, or similar protocol. It is understood that users via devices 12, 12a, . . . , 12n may access the Web/Internet via a personal computer/computing device, personal digital assistant, or like device implementing web-browser functionality, e.g., Google®, Chrome®, Safari®, Internet Explorer®, or other browsing technology that may be compatible.

In this context, FIG. 1 shows coupled to the web-based social network 98 a tool 51 comprising processing engine 50 that is programmed with software to implement functionality (i.e., stored routines, algorithms and methods) to personalize social media content aggregating and/or content curating, e.g., of the content stored in devices 35, as described herein. The user, e.g., a moderator or content curator, via a graphical user interface 15 presented on his/her computing device 12, is specifically enabled by a program running on device 12 to specify content aggregating and curating actions via the interface 15. The program running on the user device responds to selected user actions via interface 15 and causes the processing elements of device 12 to communicate control signals 45 over the networks 98, 99 to effect the desired aggregating and/or content curation in the content curation processing engine 50.

Figure 2:
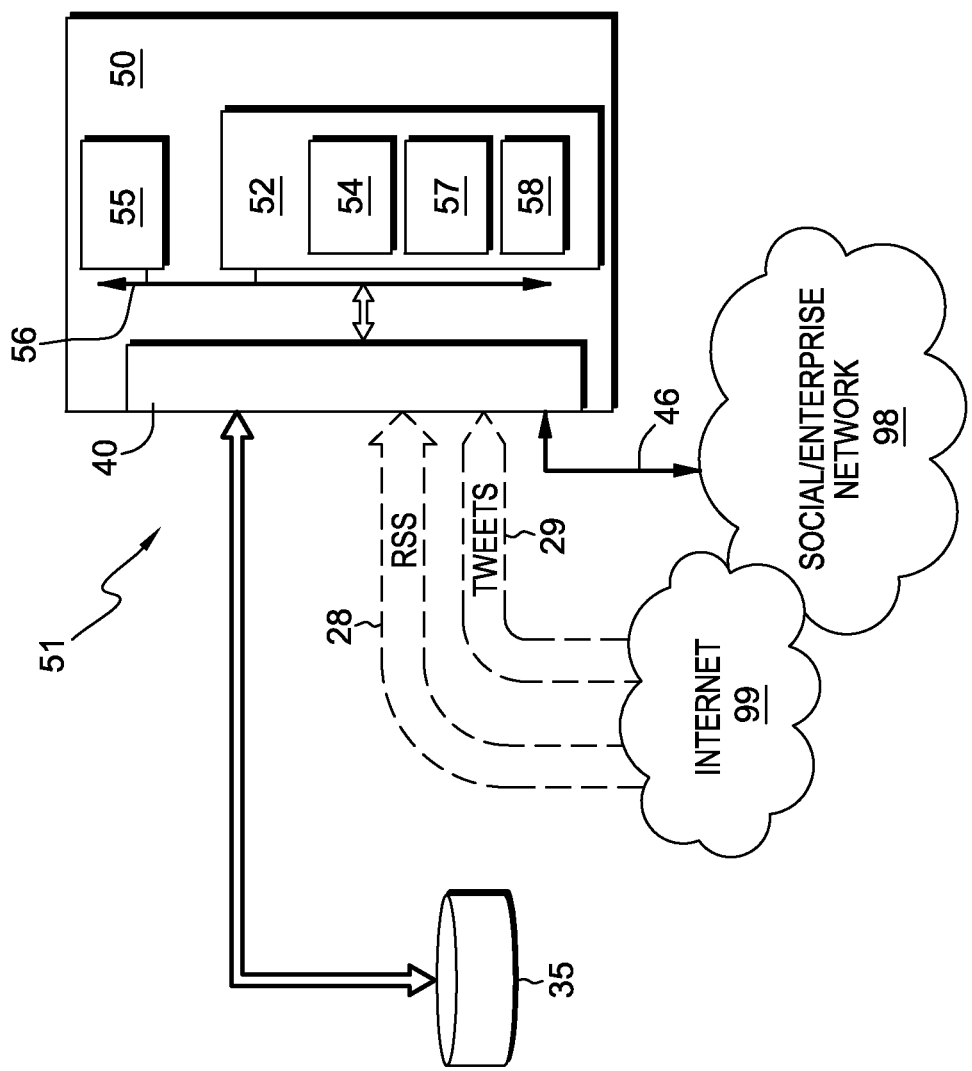
FIG. 2 depicts a block diagram of an exemplary content processing engine shown in FIG. 1.

FIG. 2 depicts a block diagram of an exemplary content processing engine 50 of web-based tool 51. The processing engine 50 is particularly an apparatus including a computer system, e.g., a desktop or laptop computer, a mobile device, a server, etc. having at least a memory storage device 52, e.g., main memory and/or a cache, and a hardware processor or like programmable control device 55 coupled to the memory device, e.g., via a data and address bus 56, wherein the hardware processor device 55 is configured to execute computer program code to perform the methodologies for content aggregating and curating as described herein. In one aspect, an associated memory storage device 52 receives and stores program code 54 embodying the functions and procedures for content management and curation that are accessed by the hardware processor device 55 to map specified commands received in signals 46 from the moderator device (not shown), to perform aggregating, curating and content management actions at the engine 50.

That is, responsive to the tool 51 receiving from the moderator any aggregating, curating or other content management commands via signals 46 received via a network input/output 40 interface, the hardware processor device 55 invokes program code 54 including processes that embody content management functionality to access, receive, store, and/or output any aggregated and/or curated data in the one or more memory storage devices 35 making up a database. This curated content may be subsequently accessed via a local network, e.g., private or public network 99 (e.g., the internet) for users having access rights, via their devices 12a, . . . , 12n. As part of the curation process, program code 54 configures processor 55 to receive and/or process Really Simple Syndication (RSS) web feeds 28 and/or Twitter feeds (tweets) 29 to aggregate for presentation to the moderator device from one or more external sources via the network 99.

Thus, for example, program code 54 when run by processor 55, may cause processing engine 50 to associate moderator selections received in signals 46 to specific action commands regarding members data content, e.g., aggregating. Such commands may include commands to identify one or more specific data contents associated with selected enterprise users or social network members, add, aggregate, rearrange or hide (curate) the data content identified to produce aggregated data in the manner as discussed herein. Storage devices embodied as a database 35 may store the aggregated content as personalized by the moderator for the users or members of the web-based social network 98.

As further shown in FIG. 2, associated memory storage device 52 receives and stores further program code 57 including functions and procedures that are accessed by the hardware processor device 55 for configuring the hardware processor device 55 to perform other content management features such as the granting of access rights to particular users. For instance, this functionality includes the setting of parameters to set access rights for users or communities of users to read or contribute content. Aggregated content may be stored as relational data associated with the enterprise or social network users in the data storage device(s) 35, e.g., configured as a relational database. Members of the web-based social network or enterprise network 98 include an associated member profile (not shown) that may be generated for the member. As known, a member can specify a relationship(s), e.g., friend or follower, with one or more other members via the member profile, or by any other means.

Further, associated memory storage device 52 receives and stores further program code 58 including functions and procedures that are accessed by the hardware processor device 55 for configuring the hardware processor device 55 to publish aggregated and curated content, so as to make the aggregated and curated content available as output to requesting users via their devices 12a, . . . , 12n having been granted access rights to the content, and communicate that content for output as wired or wireless signals 46 to a user device, e.g., via the user's interface display device. Publication program code 58 may be provided to enable publishing of the aggregated and curated content personalized by the moderator for the users/members of the web-based social or enterprise network 98. According to one embodiment, processor device 55 may be configured by program code 58 to access and provide the aggregated and/or curated content when requested by a member(s) for whom the content has been personalized. In a further embodiment, processor device 55 may be configured by program code 58 to format aggregated and curated content in a predetermined arrangement style for presentation to a member or user of the web-based social or enterprise network 98.

Although the exemplary processing engine 50 is described as storing program code 52 comprised of various components (the content management processing code 54 for aggregating and curating, the user access control and rights granting and processing code 57, and publication code processing code 58), fewer or more components may comprise the content processing engine 50 and still fall within the scope of various embodiments.

In operation, for content aggregation and curation, the hardware processor 55 of tool 51 is configured to receive the inputs including, but not limited to, the following: specification of a user, specification of content to be aggregated, and specification of usage or access rights for particular user(s).

Figure 3:
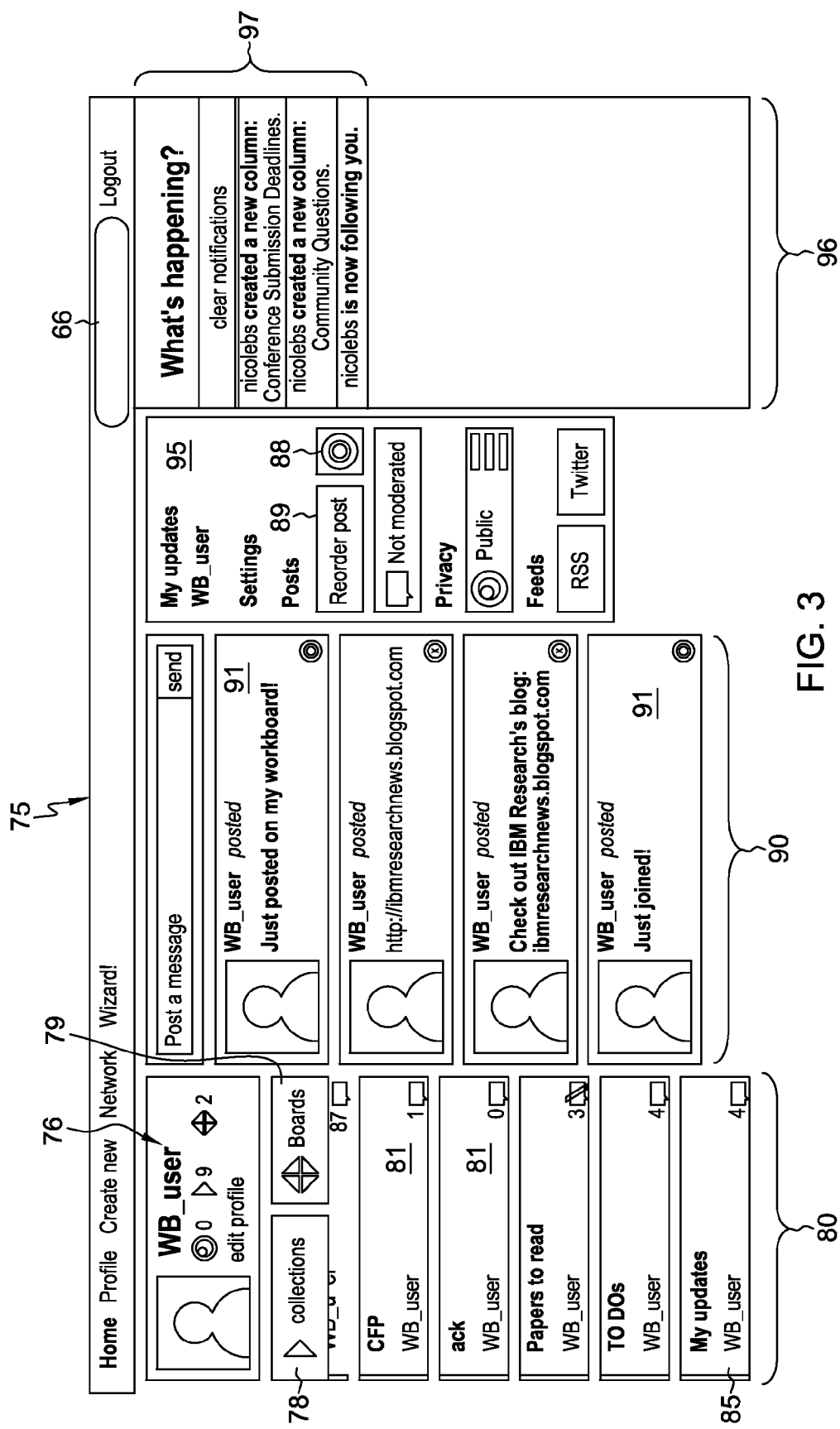
FIG. 3 is an exemplary home page screen shot 75 presented via the GUI 15 of FIG. 1.

FIG. 3 is an exemplary home page screen display 75 presented via the GUI 15 of FIG. 1 that provides the system's main management features, and particularly shows, in one embodiment, functional items presented to a moderator for personalizing, i.e., aggregating and curating content, via a moderator device 12.

For non-limiting, exemplary purposes, the screen shot 75 is oriented to a specific example of curated "microblogging" within a corporate environment. In this embodiment, the processing engine 50 is a web-based tool featuring content organization, curation and access control for an organization or corporate enterprise, for example. A content management feature is provided that builds on top of user's posts (e.g., text-only, unlimited size), and specifies two types of containers: collections and boards.

The exemplary screen shot 75 of FIG. 3 depicts the functionality specified by a user, in the example embodiment, a moderator 12 having user profile information 76 exhibited. Via the graphical user interface 15 presented via screen shot 50, the moderator invokes functionality by selecting a collections link 78 for accessing, from content storage devices 35, a list 80 of prior created/named collections 81; although not shown, alternately, via the graphical user interface 15 presented via screen shot 50, the moderator invokes functionality by selecting a collections link 79 for accessing, from content storage devices 35, a listing of boards (not shown). Additionally depicted via the screen shot 50 is the presentation of all the "posts" 91, e.g., messages that may or may not include media content, pertaining to the selected collection. For example, upon selection of a specific collection 85, the processing engine will provide the interface screen 75 with a column listing 90 of all the posts 91 in that selected collection 85. In one embodiment, all the collections or boards from the user and the people that the user follows are presented in the lists 80, with elements that were updated more recently appearing on top.

Additionally depicted via the graphical user interface 15 presented via screen shot 75 is the presentation of a "collections setting" menu portion 95 providing various user-selectable functions (e.g., buttons) for invoking various aggregation or curation filters pertaining to a collection's or board's contents. That is, menu portion 95 provides users with functionality to curate their posts, collections, and boards, as well as to configure access control to collections.

For example, upon selection of a specific collection "My Updates" collection 85, the processing engine will provide the interface screen 75 with a listing 90 of all the posts 91 in that selected collection 85. A further column 96 displayed via the interface presented by screen shot 75 may be configured to present real-time notifications 97 to user 76, e.g., from other users, and/or real-time events notifications data for the user, via known social networking functions. In one embodiment, these events are not necessarily associated to any selected collection. This column 96 obtains and indicates for the current user 76 any event notifications 97 including, but not limited to: indications of any new followers, and/or indications of any new collections and boards created by followers and followed users.

In one embodiment, a collection 81 can be arbitrarily created by the user or moderator, and are used to aggregate posts 91. Via specific functionality, invoked upon user selection of function button 88, users are allowed to freely filter, e.g., hide, selected messages (posts) in their collections.

In a further embodiment, by on-screen cursor drag & drop functionality, the moderator may change the default chronological (temporal) order of posts within the curated collection. For example, as reordering is one of the means for content curation, via further specific functionality invoked upon user selection of function button 89, users are enabled to reorder posts in a given collection 81 or in a newly created collection by, e.g. via drag and drop functionality via interface 75. Thus, as posts are aggregated into collections, via functionality herein, owners can select and hide certain posts from public view and change the default chronological order by freely rearranging them.

Figure 7B:
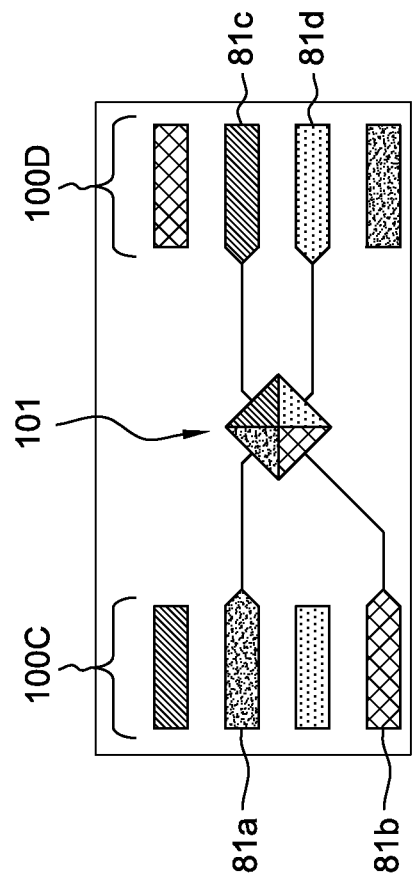
FIG. 7B depicts conceptually the moderator selecting four different collections to be replicated for a curated board in one example embodiment.
Figure 7A:
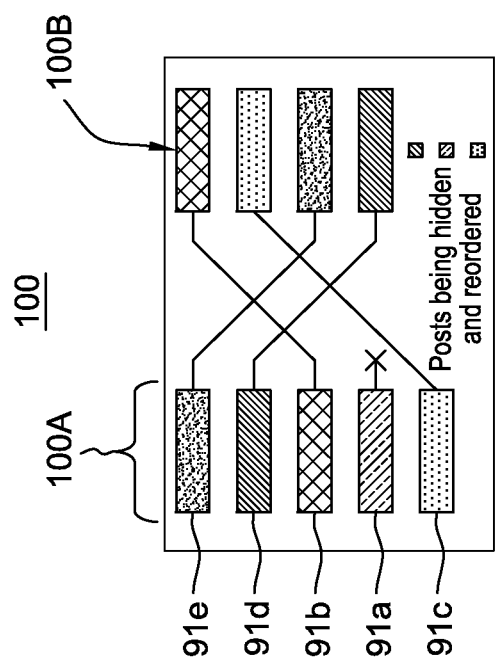
FIG. 7A depicts conceptually a moderator selecting of a post to be hidden from a curated collection, and an example result of dragging and dropping selected posts from a collection of posts in a designated order, to a different designated order in the curated collection.

FIG. 7A depicts conceptually the moderator selecting of a post 91a to be hidden from a curated collection 100B of posts; and further shows the re-arranging 100 of selected posts in a curated collection 100B wherein posts of a user's prior created collection 100A are shown in a default temporal order, and moderator selected posts 91b and 91c, 91d and 91e are shown being dragged and dropped in a different presentation order in the corresponding curated collection 100B.

Figure 3A:
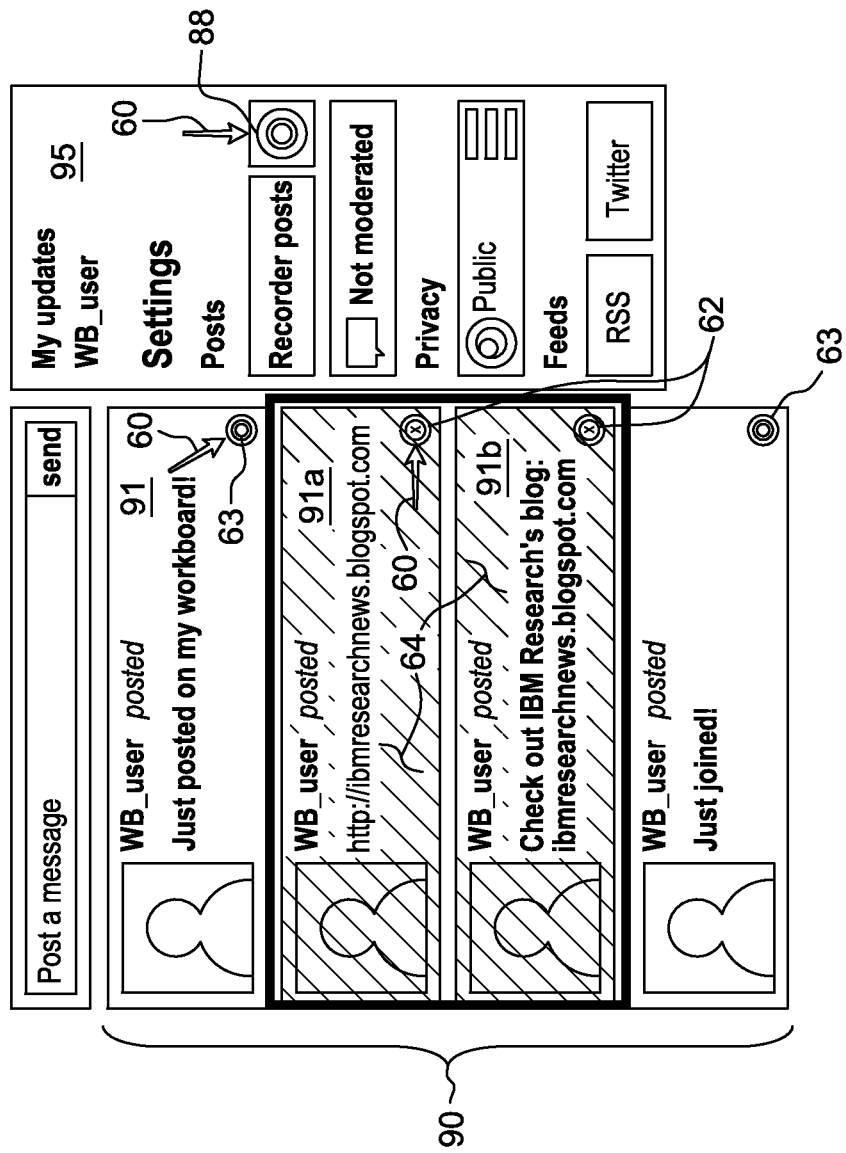
FIG. 3A depicts a more detailed view of the listings 90 depicting specific functionality for hiding posts of an existing or newly created collection.

FIG. 3A depicts a more detailed view of the listings 90 depicting specific filtering functionality to hide posts of an existing or newly curated collection. As shown, responsive to a moderator selecting and clicking one or more "hide" icons 62 for selected posts 91a and 91b using a cursor 60, the selected posts will be filtered out, i.e., become hidden, from the current collection, and not readable by users. In one embodiment, upon each selection of each specific post to be hidden in a collection, the moderator interface screen 75 will cause the selected posts to be differentiated, e.g., via a color or a hatched overlay 64, for example, as shown. As further shown in FIG. 3A, if not selected, a default icon 63 is provided at each of the posts 91 that indicate selection for inclusion in a newly curated collection. It is understood that these posts 91a, 91b will be subsequently displayable to the owner of the collection, upon selecting a view/hide button 88 from the collections setting menu 95 as the owner has original access rights to the original collection.

Via the social or enterprise network 98, users are enabled to follow others and to receive notifications, have access to their content, and posts on their collections. In one embodiment, contributions to public collections appear immediately; however in moderated collections, the owner must approve them first. Thus, a collection features both reading permissions (i.e., public or private) and writing permissions (i.e., moderated or non-moderated).

In one embodiment, responsive to moderator selections via setting menu 95, the tool's processing engine 50 implements processes embodying access management functionality, such as for instance, defining and/or modifying existing access policies for a particular collection, and/or board, that is created. For example, this functionality may include the setting parameters (e.g., sharing criteria) to indicate statuses for curated collections such as "public" (anyone can access), "selected" (moderator manually specifies a set of communities or list of individuals that can access the content), or "private" (only the creator can access the content). For example, via collections setting menu 95 of interface 75, FIG. 6, a button 73, when selected, is configured to present for display a window (not shown) in which users can be located through a keyword search and then added one by one. In a further embodiment, communities may be also listed and located through the keyword search (i.e. search for the community's name, add the community to the list, and thus all users in that community are given access to the collection).

FIG. 5 shows a detailed view of two collections from the listings 80 of collections from the home screen 75. One collection 81a is depicted with an indication as being a public collection, with an active indicator 83a to indicate the collection as being public; and the other collection 81b is indicated as being a private collection, with an active indicator 83b to indicate the collection as being a private collection. Private collections are seen only by users specified by the owner, while public collections can be seen by everyone following the content or their owner.

FIG. 5 further shows in the detailed view of two collections 81a, 81b from the listings 80 of collections from the home screen 75 with one collection 81a is depicted with an indicator 84a that the write permission for this collection is moderated, and the other collection 81b is provided with an indicator 84b as indicating that the write permission for this collection is non-moderated. The write permission moderated or non-moderated icons additionally indicate a number of posts forming the respective collection, e.g., the icon 84a shown for the moderated collection indicates 3 posts in the collection 81a, and the icon 84b shown for the non-moderated collection indicates 4 posts in the collection 81*b*. In one embodiment, followers can post in any collection to which they have access, but their messages will only be made available in moderated collections if the owner decides to have them published; in non-moderated collections, posts appear immediately.

The curation filtering capabilities to designate collections as public or private, moderated or non-moderated are provided from the collections setting menu 95 shown in FIG. 6.

FIG. 6 particularly shows a detailed view of an embodiment of the collections setting menu 95 providing the curation filtering capabilities to configure a collection, e.g., designate a collection as public or private, moderated or non-moderated. In one embodiment, access control is set by highlighting toggle buttons, which are translated to changes in the access policy for the collection. For example, highlighting moderated/non-moderated toggle button 71 will indicate write permission access control that enables users to add posts to a curated collection upon obtaining write permission from the owner (if moderated is toggled), or not (if not moderated is toggled). More specifically, in a moderated collection, users posts will come up as "hidden" first, and will only be visible to the owner (moderator). However, moderators can specify "write" permissions, and can also block external contributions completely, or specify which users are able to post (and whether those users are granted direct posting, or moderated posting), thus providing a few more levels of write-access flexibility.

Additionally, highlighting public/private toggle button 72 will indicate the contents of the curated collection as being public (available for following by any user) or private, indicating that curated collection as being private (and not accessible to certain users). For example, this functionality is used for filtering out users who would not be truly interested in a certain topic (e.g., work-related collections are irrelevant for friends and family), or for defining personal facets (corporate and personal content can be different). Further filtering functionality includes configuring restricted access to confidential content (e.g., in the case of enterprise communities).

In one embodiment, responsive to moderator selections via setting menu 95, the tool's processing engine 50 implements processes embodying access management functionality, such as for instance, defining and/or modifying existing policies to allow specific users or communities of users to contribute content to a particular collection, and/or board that is created. For example, this functionality may include the setting parameters (e.g., moderating criteria) to indicate statuses are "public" (anyone can contribute), "selected" (only specific communities can contribute), or "private" (only the creator can contribute).

As further shown in FIG. 6, the screen interface "collections setting" menu portion 95 further includes filters providing ability to additionally import into a collection Really Simple Syndication (RSS) web feeds and/or tweets associated to an input search term to aggregate from one or more websites. That is, a moderator selecting the RSS interface button 68 will responsively trigger presentation of a reader functionality (not shown) to import and present RSS feed data to the moderator that can be selected for inclusion into a collection being curated. Likewise, a moderator selecting the Twitter® interface button 69 will responsively trigger presentation of a functionality (not shown) to import and present Twitter message posts to the moderator that can be selected for inclusion into a collection being curated. Generally, users can import content that they have access to, including but not limited to: external content (i.e., content not generated by themselves) by importing web content (RSS feeds or Twitter posts), and content present in other collections accessible by that user. That is, the interface 75 includes further functionality to import/integrate a post from another user's collection into one the moderator's collection (or a collection of another user), which includes the maintaining of a link to the original collection and author. "Accessible" in this context means: either public collections (accessible to everybody), or "selected" collections in which that user1 was included. The filters 68, 69 are applied for automation of content feed from an external source (not shown).

Figure 3B:
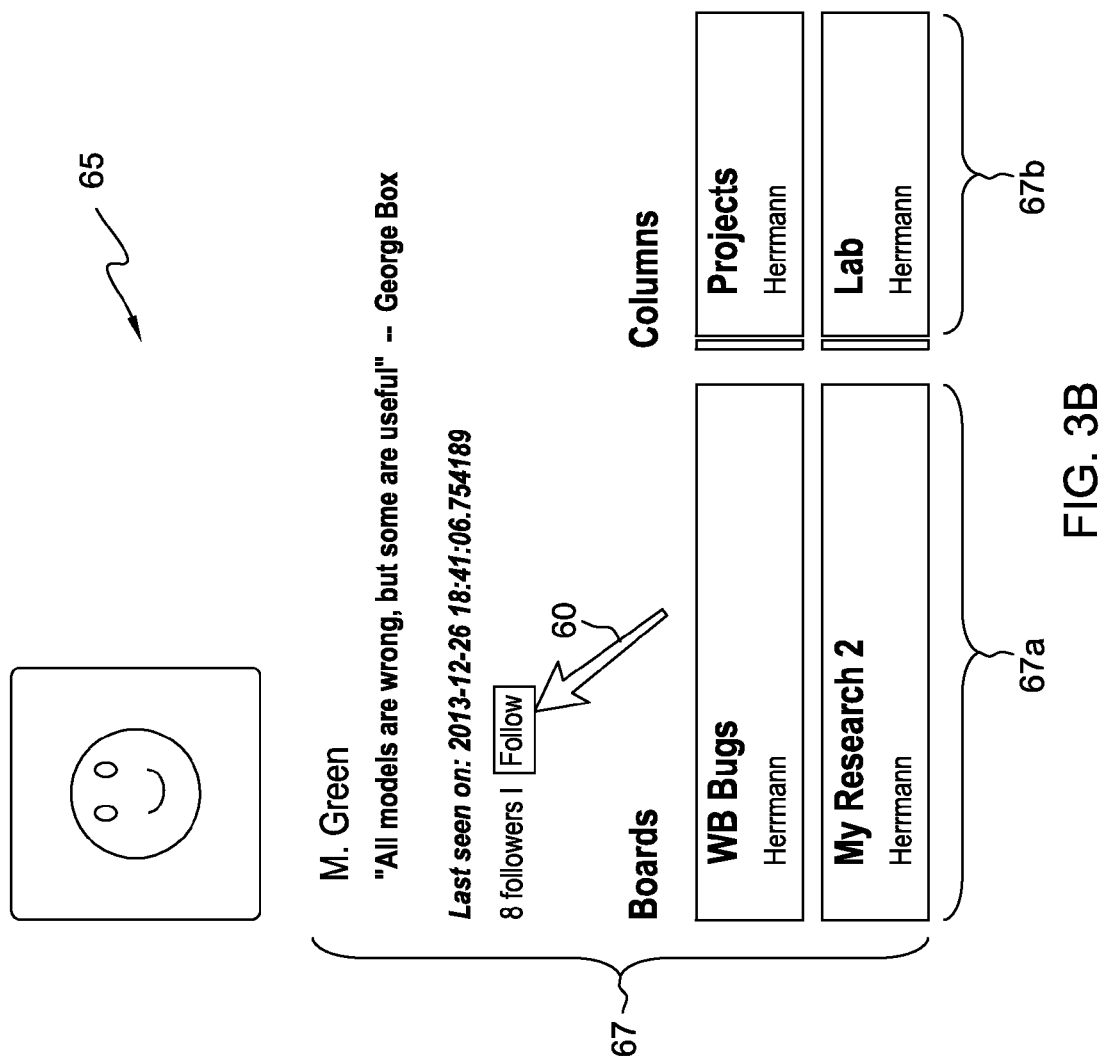
FIG. 3B shows an example interface display 65 showing example search results found responsive to a user name search entered via the exemplary interface 75 of FIG. 3.

In one embodiment, the content of the feeds comes from the user's established friend relationships with other users, and not organized around topics of interest. Thus, returning to FIG. 3, via a box 66 located in the upper right corner of the presented interface 75 as depicted, users are enabled to enter a search and eventually follow others by name. FIG. 3B shows an example interface display 65 showing example search results, wherein a searched user ("M. Green") is found responsive to a user name search (e.g., entered via search box 66), and that user's public profile 67 is presented that indicates a number of users that follow the searched user, and those collections or boards that the searched user follows. That is, the interface presented in FIG. 3B, responsive to a user search, shows the list of collections 67*b* and list of boards 67*a* that the user owns. That is, the presented interface 65 provides that users found by search can be followed from their public profile view.

In one embodiment, for example, when a user1 follows a user2, all user2's collections accessible to user1 appear in user1's collections list, and that is the only way one can get access to other user's content. Users may further use a "search" functionality (e.g., a keyword search, or perhaps through an automated suggestion engine), to search among all users as well as all accessible collections from users (not necessarily the ones that user follows). Users could still follow other users (and thus all of their content), but is further given the freedom to subscribe to specific parts of another user's content as opposed to all of it, if desired.

Figure 4:
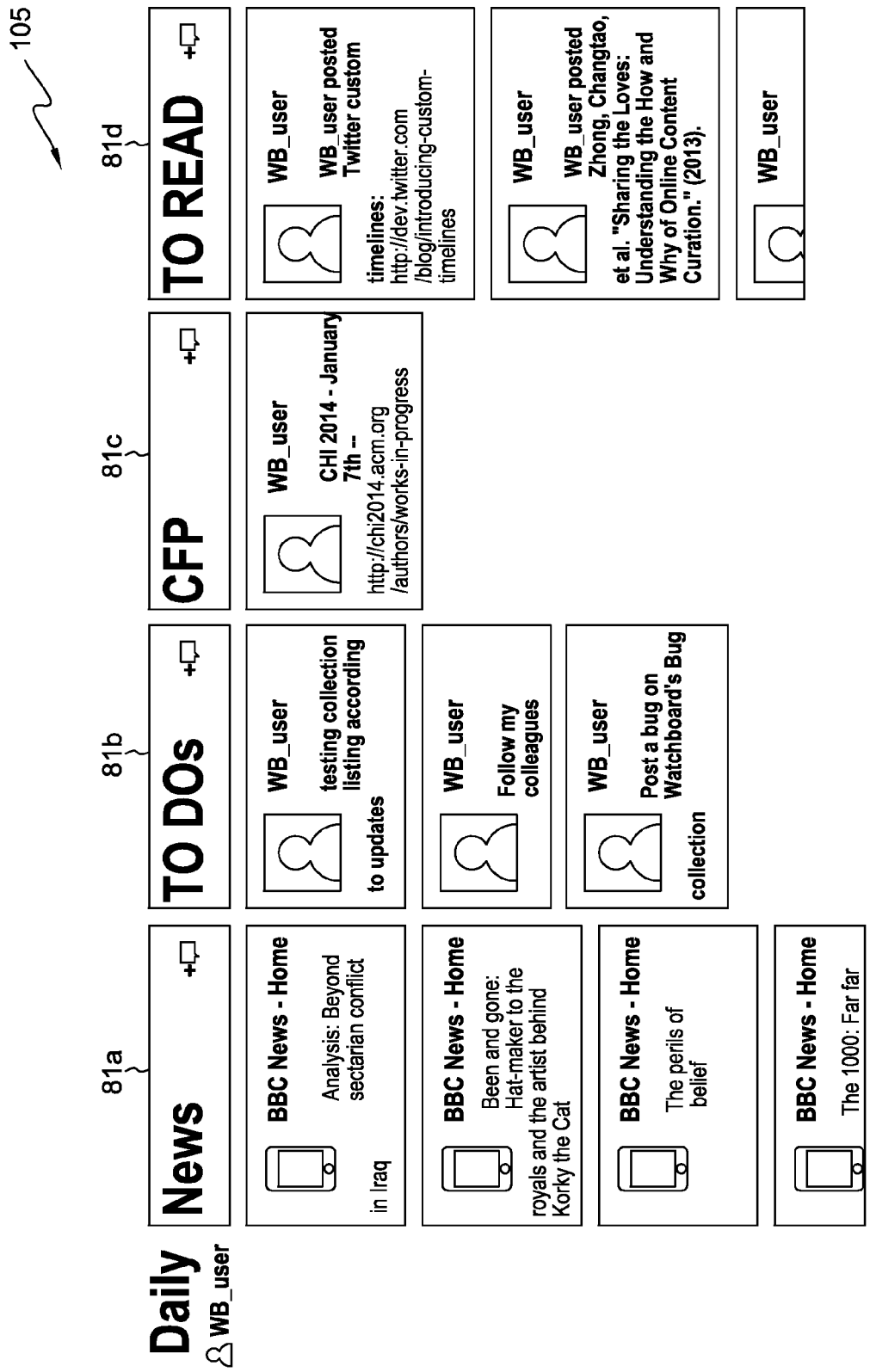
FIG. 4 shows a full screen display shot 105 of boards responsive to user selection of the boards selection button 79 of interface 75 of FIG. 3.

In one embodiment, boards are used to aggregate collections and provide a second degree of content arrangement for the curator (moderator). In one embodiment, a moderator may aggregate up to four (4) collections (e.g., to avoid clutter) but the amount of collections is configurable. FIG. 4 shows a full screen display shot 105 of a board responsive to user selection of the boards selection button 79 of interface 75 of FIG. 3 and configured to simultaneously display a board having collections content 81*a*, 81*b*, 81*c*, 81*d* in a way that is optimized for a full-screen layout. Of these, collection 81*d* of the board is indicated as a private collection, and collection 81*b* is indicated as a moderated collection.

FIG. 7B depicts conceptually the moderator selecting the four (4) different collections to be replicated for a curated board, wherein in the example shown, a moderator selects via interface 75 existing collections 81*a* and 81*b* owned by a user, and further selects collections 81*c* and 81*d* owned by other people followed by that user and links these together to a curated board 101.

Overall, content organization and filtering tools provided in the described system employ methods herein that are important for content management and awareness.

Figure 8A:
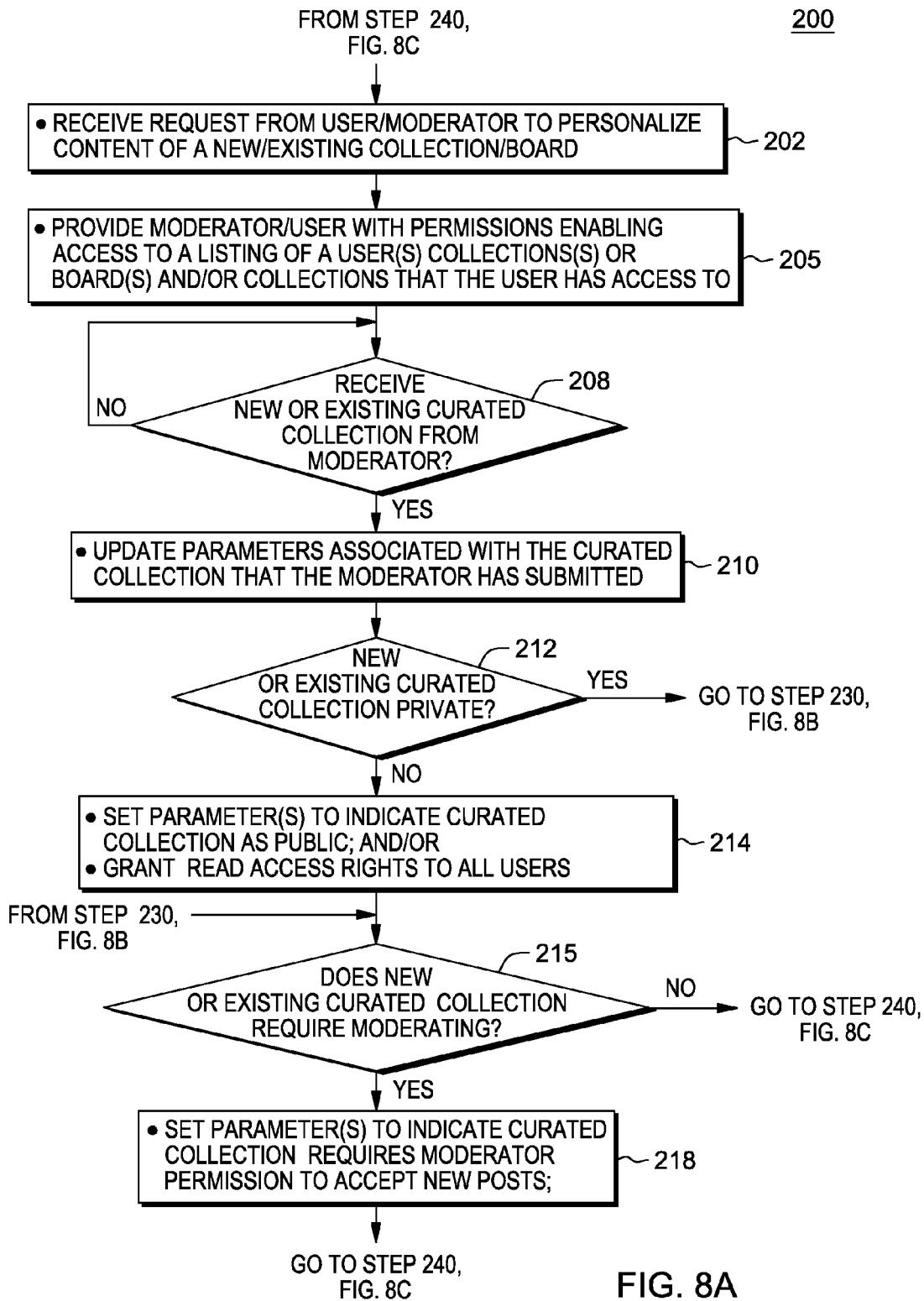
FIGS. 8A-8C illustrate a flow diagram of an exemplary process for collection curation for members of a web-based social network in one embodiment.
Figure 8B:
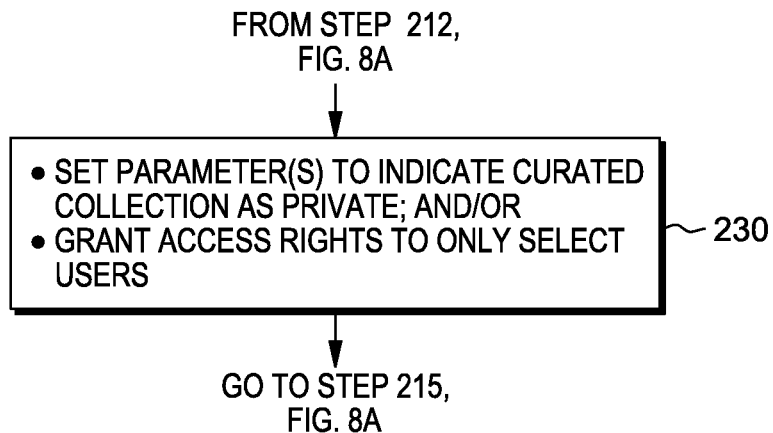
Figure 8C:
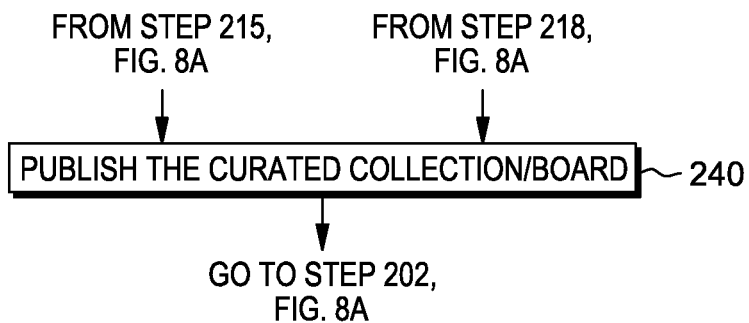

FIGS. 8A-8C depict a method 200 employed by the processing tool 51 for generating, curating and presenting personalized content for members of a web-based social or enterprise network in one embodiment, and particularly the methods to employ resources for grouping related information together through collections, as well as organizing posts in any desired order for publishing, disseminating the content, and selectively restricting access as defined by the user. While the method is depicted in terms of processing collections, it is understood that similar method steps would be employed for curating a board from multiple collections.

In FIG. 8A, at step 202, there is indicated the first step of the processing engine 50 receiving a request from a user to access or personalize content. Responsive to this, the processing engine 50 establishes who the moderator(s) is of the collection being curated. For example, the moderator could be the owner of the collection (the user that created the collection) or any other designated user (or users), who has (have) permission to personalize content. Thus, responsive to the received user request, at 205, the processing engine 50 verifies the user as the moderator and grants the access to particular collection(s) the moderator has rights to, and provides moderator access to a listing of a user(s) collections(s) or board(s) and/or collections that the user has access to via the interface. Generally, any request to access content to curate may require identifying the user and his/her access control rights, e.g., by identifying settings of any associated database content access control parameters for the requested content (e.g., "public", "selected", or "private") applied to collections or boards, activating any control parameters for the particular collections of the content (e.g., collections, boards) that the user is enabled access to for personalization, and activating any control parameters for any content (collections, boards) of other users that the user has access to. By the processing engine activating access control parameters, the moderator or user is thus provided with the access permission to remotely access the requested collections/boards data from the databases 35 that populate the user interface 75 for aggregation and curation via the user interface 75 as described herein. It is understood that in one embodiment, a moderator/user may just want to access content for viewing, and not modify anything.

Thus, via the interface, the moderator/user is now enabled to select or create a collection for personalization, and aggregate (select) relevant posts within the collection, hide posts, and/or rearrange the order of posts within the retrieved collection to curate the collection, and/or additionally render the collection as private or public, and/or indicate the granting of user rights to write to (e.g., add posts to) the collection. In one example, the owner of the existing collection is granted access rights to the original collection (i.e., a collection before changes) and the curated one (i.e., the collection after changes). It should be understood that "original" collections may have been curated before, i.e., curation is not a one-time action, it is an effort that happens and may evolve over time. Alternately, or in addition, the moderator/user may further select a collection(s), and/or select different collections from a variety of followed users to curate a board. Once the personalization is complete the user will submit the curated collection/board as a new collection or have it replace the existing collection with the user rights as curated.

FIG. 8A, at step 208 depicts a step of waiting to receive a new modification/a list of modifications on a certain collections/board. Once the moderator submits the new curated collection or existing collection that has been curated, or alternately, during the curating process responsive to the moderator selections at step 210, FIG. 8A, the processing engine performs functionality to update the access policy for the new curated collection and particularly update the parameters associated with the curated collection that the moderator has submitted. For example, at this step, filter parameters may be set to indicate in an access policy for the new submitted curated collection, those posts that have been aggregated (selected) for inclusion in the collection, and the order in which those posts are to be presented to users granted access rights. Further, at this step, access policy parameters for this curated collection may be set to indicate for the new submitted curated collection those posts to be hidden (removed) from the view of the collection.

Then, continuing to step 212 the processing engine performs methods to ascertain whether the curated collection has been rendered public, selected (restricted) or private. Thus, a determination is made at step 212 to determine if the new or existing curated collection is private. If the new curated collection is not private, the method continues at step 214, FIG. 8A, to set parameters indicating the new curated collection as public—thereby granting read/viewing access rights to this collection for all users. Otherwise, if it is determined that the new or existing curated collection is designated by the moderator as private, then the process proceeds to step 230, FIG. 8B to confer in the database 35, the private access rights grant to select users for providing read access to the curated collection designated private. Once these rights for private user access are provided to the system, the process returns to step 215, FIG. 8A.

At step 215, FIG. 8A, a further determination is made as to whether the new or existing curated collection is designated as requiring moderation. If the new curated collection is indicated as moderated, i.e., requires owner approval for adding additional user content posts into the curated collection, the method continues at step 218, FIG. 8A, to set parameters for the collection to indicate the new curated collection as requiring user approvals to enter new content into the collection. Then, the process proceeds to step 240, FIG. 8C. Otherwise, at step 215, if it is determined that the new or existing curated collection does not require input moderation, then the process proceeds to step 240, FIG. 8C.

At step 240, FIG. 8C, the stored generated dynamic relationship-based content is published for the members of the social or enterprise network 98. In one embodiment, the processing engine or like server is configured to send the content to a member(s) for whom the content has been personalized.

The process is then terminated and returns back to step 202, FIG. 8A, to await a new moderator curated collections or boards submission.

Thus, in one embodiment, once the access control and relational user parameters are set in accordance with the processing depicted in the method of FIGS. 8A-8C, responsive to the moderator personalizing and submitting a new or existing curated collection, the processing engine updates the databases and access policies to the curated collections or boards to provide users or select users with the views of collections as curated. That is, upon requesting a view of a particular collection, the processing engine will ascertain the set parameters and identify all of the posts within the collection and users having access rights to the collection for presentation to any user device 12a, . . . 12n (of FIG. 1).

Example scenarios are now provided:

Example 1

Upon user registration via the functional interface 75 via tool 10, one would like to create a new collection to aggregate and organize content of interest. Once a new collection is created, it is possible for the user to generate new content or aggregate data from a foreign source or other collections into his/her own collection. If the user finds out that some of the aggregated content contained in his collection "C" is confidential, he/she can enhance privacy by modifying C's sharing criteria. As a result, other users will not be able to see, replicate, or receive feeds from that collection anymore (with the possible exception of some users that may be selected by the owner to have free access).

Example 2

In another collection, a user would not like to permit that any kind of content is published there because of personal concerns. Moderation consents the collection's owner to control the publication of content by leaving unapproved content pending awaiting for his/her (positive) verdict. Even if the collection requires content approval, it may be public for other users to see, republish and replicate this subgroup. Organization of collection content is fully flexible and can be organized at its owner's (moderator's) will. For example, ownership of a column of posts allows a user to reorganize content in desired order (FIG. 7A).

For instance, one figment of a collection's content presents a question which is answered by another user after several others have posted related but not quite accurate answers. The owner has the possibility to rearrange the content to approximate the answer to the question in order to facilitate information retrieval and visualization. As well there is the capability of disabling content which the owner thinks it shouldn't belong to the collection. Additionally, filters are applied for automation of content feed from an external source.

Example 3

At last the collection becomes a unique combination of information ordered according to user's desire with high flexibility for future modification. If a collection is public, every registered user is capable of replicating it, aggregating its content to other collections, contributing to it with new content (e.g., depending if the collection has "write" or moderated write restrictions) or just watching its development. Heading towards another level, a user may find interest in grouping collection to deploy a board of interests. A board consists of one or more collections that may belong to different users. It is possible at any time to substitute some or all the collections composing a board with other collections. Likewise the board owner must be aware that if the composing collections are not owned or moderated by him/her, he/she cannot control its content and how things are published there.

Figure 9:
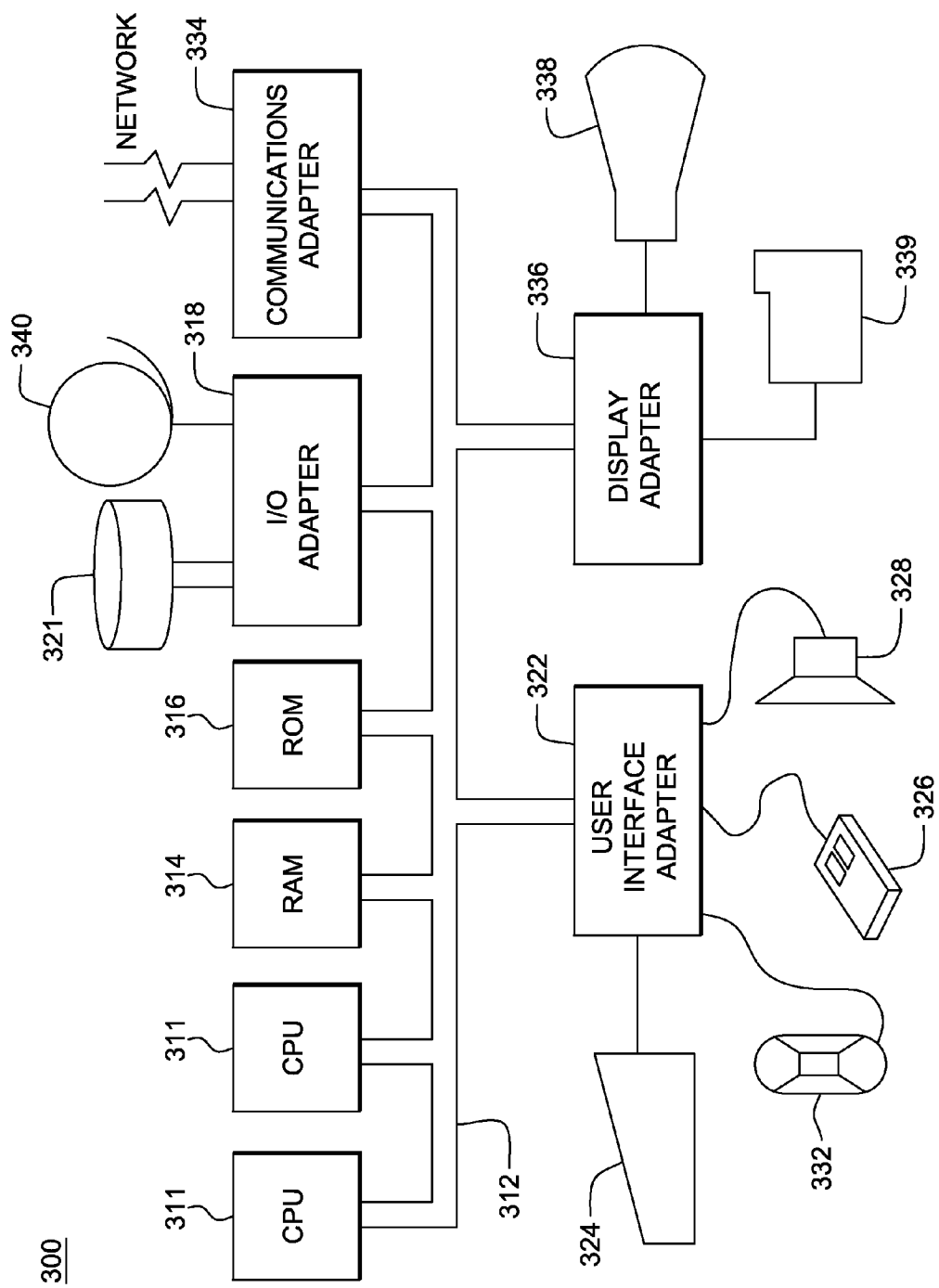
FIG. 9 depicts an exemplary hardware configuration for performing methods such as described in FIGS. 8A-8C in one embodiment.

FIG. 9 illustrates one embodiment of an exemplary hardware configuration of a computing system 300 programmed to perform the method steps for implementing content aggregation and curation and publication in the manner as described herein with respect to FIGS. 8A-8C. The hardware configuration preferably has at least one processor or central processing unit (CPU) 311. The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting the system 300 to a data processing network, the Internet, an Intranet, a local area network (LAN), etc., and a display adapter 336 for connecting the bus 312 to a display device 338 and/or printer 339 (e.g., a digital printer of the like).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A tool for curating electronic content comprising:
   a memory storage device for storing content previously created by one or more users of a social network, said content including at least one container having a plurality of content elements;
   a processor device associated with said memory storage device, wherein said processor device is configured to perform method steps to:
   receive, via commands communicated over a network from a computer device, a user selection of a container having said plurality of content elements;
   respond to said commands communicated from the computer device to aggregate select elements from said container;
   respond to said commands communicated from the computer device to filter out select elements from said container;
   respond to said commands communicated from the computer device to rearrange an order of select elements in said container;
   create a new container having said aggregated elements in said rearranged order with select elements filtered out to prevent access by other users; and
   publish, for access by select user devices over the network, the new container; and
   respond to commands communicated from the computer device to set access control rights for members of said social network to contribute further content to said new container, wherein to set said access control rights for members, said processor device is further configured to:
   set a filter parameter associated with said new container to indicate said new container as enabled to:
   receive additional contribution of content elements by all members of the social network;
   receive additional contribution of content elements by a community of selected members of the social network; or
   receive additional contributions of content elements from all or select members of a community, to be reviewed by a moderator first before publication; and
   prevent any members of the social network form contributing content elements to said new container.

2. The tool according to claim 1, wherein said content elements include user posts of messages communicated amongst users of the social network, said at least one container comprising a collection of said user posts, wherein to filter out select elements, said processor device is further configured to:
   identify a selected user post in said collection to be filtered; and
   set a filter parameter associated with said new container to hide said user post from a view of said aggregated elements of said new container when displayed at selected remote computer devices of said other users.

3. The tool according to claim 2, wherein said at least one container includes a user created board, said content elements comprising one or more collection containers, each collection container comprising said collection of said user posts, wherein to aggregate select elements, said processor device if further configured to:
  identify one or more selected collection containers in said board to be included in a new board; and
  set a filter parameter associated with said new container to aggregate said identified collection containers for said new board when displayed at selected remote computer devices of said other users.

4. The tool according to claim 1, wherein said content elements include user posts of messages communicated amongst users of the social network in a default chronological order, said at least one container comprising a collection of said user posts, wherein to rearrange an order of select elements, said processor device is further configured to:
  identify a selected user post in said collection to be in rearranged order; and
  set a filter parameter to enable said new container to present a view of said elements in a desired order when displayed at selected remote computer devices of said other users.

5. The tool according to claim 1, wherein said processor device is further configured to:
  respond to commands communicated from the computer device to set access control rights for members of said social network to view said new container.

6. The tool according to claim 5, wherein to set access control rights for members to view, said processor device is further configured to:
  set a filter parameter associated with said new container to indicate contents of said new container as being one of:
  publically available for view by all members of the social network;
  selectively available for view by a selected community, or by select members of the social network; or
  privately available for view only by the owner of the container.

7. The tool according to claim 1, wherein said processor device is further configured to:
  respond to said commands communicated from the computer device to aggregate for inclusion in said new container, additional web-based content elements received from an external source.

8. The tool according to claim 7, wherein said additional web-based content elements received from an external source comprises: RSS feeds or Twitter® message posts.

9. A method for curating electronic content comprising:
  storing, in a memory storage device, content previously created by one or more users of a social network, said content including at least one container having a plurality of content elements;
  receiving, at a processor device associated with said memory storage device, commands communicated over a network from a computer device of a user, to select a container having said plurality of content elements;
  aggregating, by said processor device, responsive to said commands communicated from the computer device, select elements from said container;
  filtering out, by said processor device, responsive to said commands communicated from the computer device, select elements from said container;
  rearranging, by said processor device, responsive to said commands communicated from the computer device, an order of select elements in said container;
  creating a new container having said aggregated elements in said rearranged order with select elements filtered out to prevent access by other users; and
  publishing, for access by select user devices over the network, the new container, and
  setting, by said processor device, responsive to commands communicated from the computer device, access control rights for members of said social network to contribute further content to said new container, wherein said setting access control rights for members comprise:
  setting a filter parameter associated with said new container to indicate said new container as enabled to:
    receive additional contribution of content elements by all members of the social network;
    receive additional contribution of content elements by a community of selected members of the social network; or
    receive additional contributions of content elements from all or select members of a community, to be reviewed by a moderator first before publication; and
    prevent any members of the social network form contributing content elements to said new container.

10. The method according to claim 9, wherein said content elements include user posts of messages communicated amongst users of the social network, said at least one container comprising a collection of said user posts, wherein said filtering out select elements comprises:
  identifying a selected user post in said collection to be filtered; and
  setting a filter parameter associated with said new container to hide said user post from a view of said aggregated elements of said new container when displayed at selected remote computer devices of said other users.

11. The method according to claim 10, wherein said at least one container includes a user created board, said content elements comprising one or more collection containers, each collection container comprising said collection of said user posts, wherein said aggregating of select elements comprises:
  identifying one or more selected collection containers in said board to be included in a new board; and
  setting a filter parameter associated with said new container to aggregate said identified collection containers for said new board when displayed at selected remote computer devices of said other users.

12. The method according to claim 9, wherein said content elements include user posts of messages communicated amongst users of the social network in a default chronological order, said at least one container comprising a collection of said user posts, wherein said rearranging an order of select elements comprises:
  identifying a selected user post in said collection to be in rearranged order; and
  setting a filter parameter to enable said new container to present a view of said elements in a desired order when displayed at selected remote computer devices of said other users.

13. The method according to claim 9, further comprising:
  setting, by said processor device, responsive to commands communicated from the computer device, access control rights for members of said social network to view said new container.

14. The method according to claim 13, wherein the setting of access control rights for members to view comprises:
setting a filter parameter associated with said new container to indicate contents of said new container as being one of:
publically available for view by all members of the social network;
selectively available for view by a selected community, or by select members of the social network; or
privately available for view only by the owner of the container.

15. The method according to claim 9, further comprising:
aggregating, by said processor device, responsive to said commands communicated from the computer device, additional web-based content elements received from an external source for inclusion in said new container.

16. A computer program product for curating electronic content, the computer program product comprising a computer readable storage medium, the computer readable storage medium not a propagating signal, the computer readable storage medium readable by a processing circuit and storing instructions run by the processing circuit for performing a method, said method comprising:
storing, in a memory storage device, content previously created by one or more users of a social network, said content including at least one container having a plurality of content elements;
receiving, at a processor device associated with said memory storage device, commands communicated over a network from a computer device of a user, to select a container having said plurality of content elements;
aggregating, by said processor device, responsive to said commands communicated from the computer device, select elements from said container;
filtering out, by said processor device, responsive to said commands communicated from the computer device, select elements from said container;
rearranging, by said processor device, responsive to said commands communicated from the computer device, an order of select elements in said container;
creating a new container having said aggregated elements in said rearranged order with select elements filtered out to prevent access by other users; and
publishing, for access by select user devices over the network, the new container, and
setting, by said processor device, responsive to commands communicated from the computer device, access control rights for members of said social network to contribute further content to said new container, wherein said setting access control rights for members comprise:
setting a filter parameter associated with said new container to indicate said new container as enabled to:
receive additional contribution of content elements by all members of the social network;
receive additional contribution of content elements by a community of selected members of the social network; or
receive additional contributions of content elements from all or select members of a community, to be reviewed by a moderator first before publication; and
prevent any members of the social network form contributing content elements to said new container.

* * * * *